(12) United States Patent
Pawl

(10) Patent No.: US 8,591,635 B2
(45) Date of Patent: Nov. 26, 2013

(54) FLUID AERATION-REDUCTION SYSTEM

(75) Inventor: E. Timothy Pawl, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 112 days.

(21) Appl. No.: 13/329,385

(22) Filed: Dec. 19, 2011

(65) Prior Publication Data

US 2013/0152796 A1 Jun. 20, 2013

(51) Int. Cl.
*B01D 19/00* (2006.01)

(52) U.S. Cl.
USPC .............. 96/211; 96/212; 95/261; 184/6.23

(58) Field of Classification Search
USPC ............ 95/261; 96/212, 211, 210, 209; 184/6.23
See application file for complete search history.

(56) References Cited

U.S. PATENT DOCUMENTS

| | | | |
|---|---|---|---|
| 3,130,022 A * | 4/1964 | Clark | 96/187 |
| 4,189,377 A | 2/1980 | Dahlberg et al. | |
| 4,714,139 A | 12/1987 | Lorenz et al. | |
| 5,510,019 A * | 4/1996 | Yabumoto et al. | 210/137 |
| 5,584,650 A | 12/1996 | Redmond et al. | |
| 5,587,068 A * | 12/1996 | Aho et al. | 96/210 |
| 5,676,717 A | 10/1997 | Cope et al. | |
| 6,210,575 B1 | 4/2001 | Chase et al. | |
| 6,279,556 B1 | 8/2001 | Busen et al. | |
| 6,858,130 B2 | 2/2005 | Hiltunen | |
| 7,918,316 B2 | 4/2011 | Beier | |
| 2007/0163442 A1* | 7/2007 | Saito et al. | 96/209 |
| 2008/0179227 A1* | 7/2008 | Saito | 210/109 |
| 2009/0288378 A1* | 11/2009 | Garcia | 55/345 |

* cited by examiner

*Primary Examiner* — Duane Smith
*Assistant Examiner* — Douglas Theisen
(74) *Attorney, Agent, or Firm* — Frederick A. Krieger

(57) ABSTRACT

A separator may include a body, an inlet portion, and an outlet conduit. The body may include a conical interior surface defining a conical cavity. The cavity may have a first outlet at a tip of the body. The inlet portion may be connected to the body and may include an outer surface, a cylindrical inner surface, and a first inlet passage extending between the outer surface and the inner surface. The inner surface may be defined by the longitudinal axis. The first inlet passage may be positioned relative to the inner surface such that a fluid flow through the first inlet passage is generally tangent to the inner surface. The outlet conduit may extend through the inlet portion and into the cavity. The outlet conduit may include a second inlet passage disposed inside of the cavity and a second outlet disposed outside of the body and the inlet portion.

18 Claims, 5 Drawing Sheets

FLUID AERATION-REDUCTION SYSTEM

FIELD

The present disclosure relates to a system for removing gas from a fluid.

BACKGROUND

A vehicle may include an engine having an oil pan containing a volume of oil. The oil may be pumped to various components of the engine to lubricate and/or cool the components. Engine oil can also be used to hydraulically actuate various systems such as a variable cam phasing system, a cylinder deactivation system, and/or a variable valve timing system, for example. Air and/or other gases can become entrained in the oil, which can adversely affect various properties of the oil such as viscosity, weight and/or capacity to retain heat, for example.

SUMMARY

The present disclosure provides a separator device that may include a main body, an inlet portion, and a gas outlet conduit. The main body may include a conical interior surface defining a conical cavity. The conical interior surface may be defined by a longitudinal axis. The conical cavity may have a first outlet at a tip of the main body. The inlet portion may be connected to the main body and may include an outer surface, a cylindrical inner surface, and a first inlet passage extending between the outer surface and the cylindrical inner surface. The cylindrical inner surface may be defined by the longitudinal axis. The first inlet passage may be positioned relative to the cylindrical inner surface such that a fluid flow through the first inlet passage is generally tangent to the cylindrical inner surface. The gas outlet conduit may extend through the inlet portion along the longitudinal axis and into the conical cavity. The gas outlet conduit may include a second inlet passage disposed inside of the conical cavity and a second outlet disposed outside of the main body and the inlet portion.

In some embodiments, the inlet portion includes a plurality of first inlet passages angularly spaced apart from each other. The conical cavity may be configured to receive fluid from each of the first inlet passages.

In some embodiments, the gas outlet conduit may include a substantially cylindrical portion and a tapered portion. The tapered portion may be axially aligned with the conical cavity. In some embodiments, the second inlet passage may be disposed at a tip of the tapered portion. In other embodiments, the second inlet passage is disposed on the tapered portion between a tip of the tapered portion and the cylindrical portion.

In some embodiments, the outlet conduit may include a plurality of second inlet passages disposed radially inward relative to the conical interior surface and the cylindrical inner surface.

In some embodiments, the first outlet may be defined by a surface of the main body that is disposed at a non-perpendicular angle relative to the longitudinal axis.

In another form, the present disclosure provides a system that may include a reservoir and a separator device. The reservoir may contain a liquid. The separator device may be disposed in the reservoir and may include a body and a conduit. The body may have a conical interior cavity, a first inlet in fluid communication with the conical interior cavity, and a first outlet in fluid communication with the conical interior cavity. The conduit may include a second outlet and a second inlet in communication with the conical interior cavity. The first inlet and the first outlet may be submerged below a surface of the liquid such that the conical interior cavity receives liquid from the first inlet and discharges liquid back into the reservoir through the first outlet. The second outlet may be disposed above the surface of the liquid such that the second outlet discharges a gas separated from the liquid above the surface of the liquid.

In some embodiments, the first outlet may be disposed proximate a pump inlet disposed in the reservoir. The reservoir may be an engine oil pan and the liquid may be an engine oil.

In some embodiments, the liquid may follow a cyclonic flow path through the body of the separator device.

In some embodiments, the system may include a plurality of separator devices disposed proximate an inlet of a pump component in the reservoir.

In some embodiments, the system may include a first bracket member including a first hub member engaging the pump component and a plurality of first arm members each engaging a respective one of the plurality of separator devices. In some embodiments, the system may include a second bracket member including a second hub member engaging the pump component and a plurality of second arm members each engaging the conduit of a respective one of the plurality of separator devices.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

DETAILED DESCRIPTION

Figure 1:
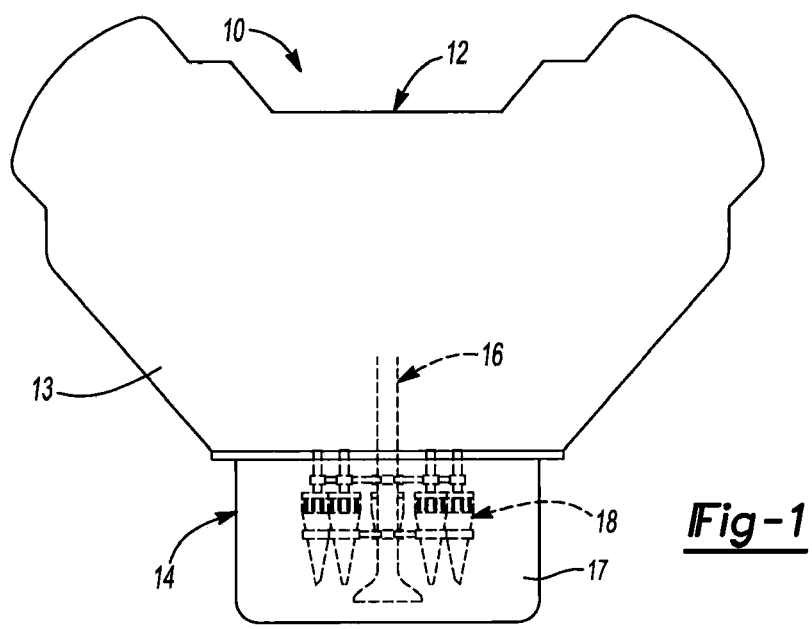
FIG. 1 is a schematic representation of an engine including an aeration-reduction system according to the principles of the present disclosure.

In an exemplary embodiment and with reference to FIGS. 1-7, an engine 10 is provided that may include an engine block 12 and an oil pan 14. The engine 10 may propel a vehicle, for example, or provide power to any other machine or apparatus. The oil pan 14 may include a reservoir 17 containing a volume of oil 15 adapted to lubricate and/or cool various components of the engine 10. An oil pump 16 and an aeration-reduction system 18 may be at least partially disposed within the reservoir 17 of the oil pan 14. The oil pump 16 may pump the oil 15 to the various components of the engine 10. The oil 15 may include entrained gases including air, fuel vapor, and/or exhaust gases, for example. As will be subsequently described, the aeration-reduction system 18 may be operable to separate the entrained gases from the liquid oil 15, remove the gases from the oil pan 14, and return the liquid oil 15 to the reservoir 17 with a reduced aeration percentage.

Figure 6:
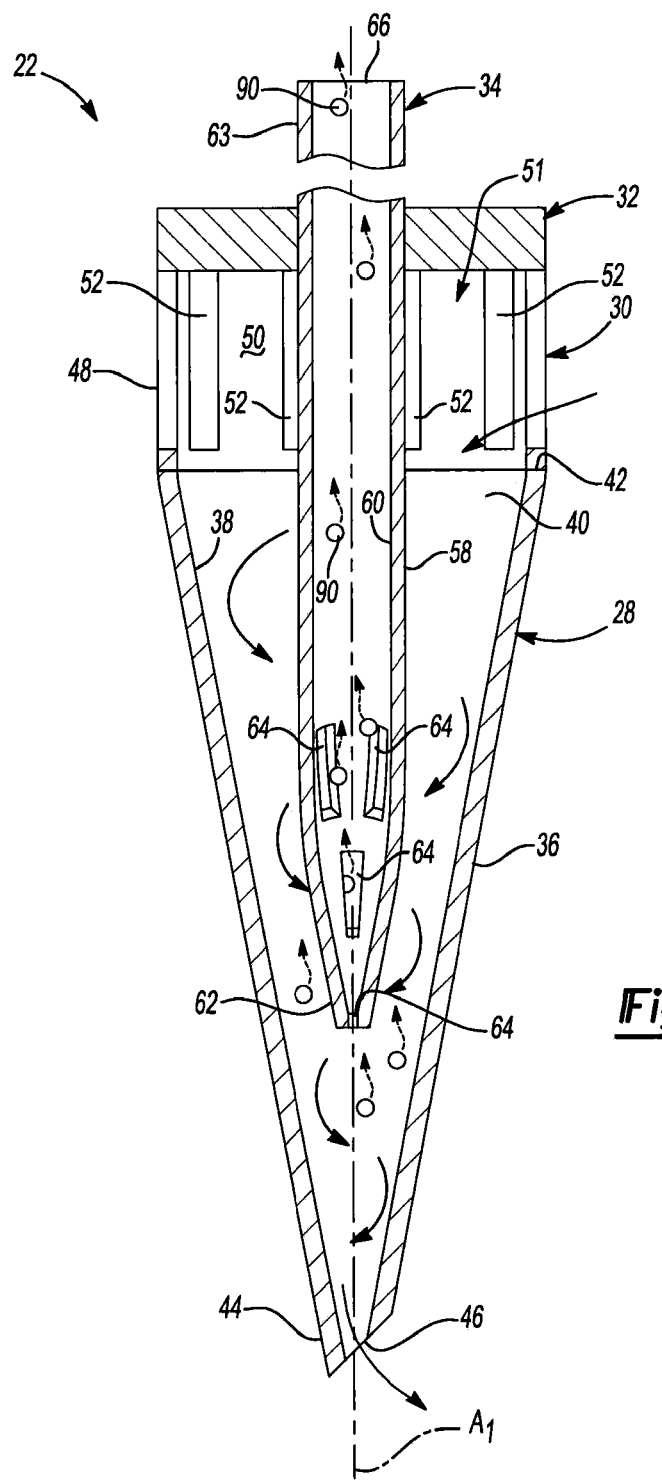
FIG. 6 is a cross-sectional view of the separator taken along line 6-6 of FIG. 4.

The aeration-reduction system 18 may be at least partially disposed beneath a surface 20 of the oil 15 in the oil pan 14, and may include one or more separators 22, an upper bracket 24, and a lower bracket 26. Each of the separators 22 may include a main body 28, an inlet body 30, a cap 32, and a conduit 34. The main body 28 may be a generally conical member including an outer surface 36 and an inner surface 38. The inner surface 38 may be defined by a longitudinal axis A1 (shown in FIGS. 5-7) and may form a conical cavity 40. The outer surface 36 may define a base 42 and a tip 44 of the main body 28. The tip 44 may include an outlet 46 in communication with the conical cavity 40 and the reservoir 17. The outlet 46 can be angled or tapered relative to the longitudinal axis A1, as shown in FIG. 6. The outlet 46 can be disposed at a forty-five degree angle relative to the longitudinal axis A1, for example, or any other angle. In some embodiments, the outlet 46 could be substantially perpendicular to the longitudinal axis A1.

Figure 7:
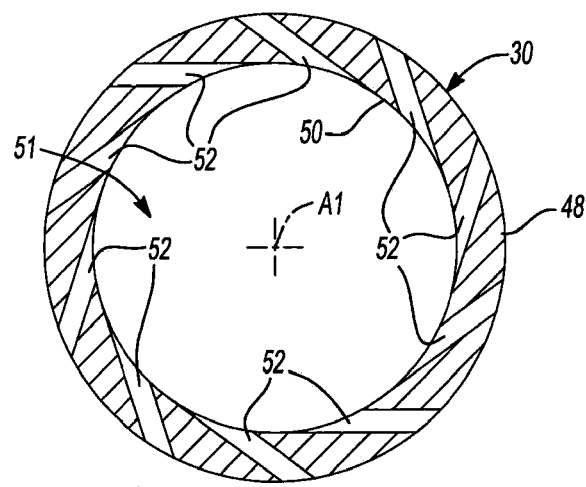
FIG. 7 is a cross-sectional view of an inlet body of the separator taken along line 7-7 of FIG. 5.

The inlet body 30 may be a generally cylindrical member mounted to or integrally formed with the main body 28. The inlet body 30 may include an outer surface 48 and an inner surface 50. The inner surface 50 may define a cylindrical cavity 51 that is coaxial with and in fluid communication with the conical cavity 40. The inlet body 30 may also include one or more inlet passages 52 that extend through the outer surface 48 and the inner surface 50. Each inlet passage 52 may extend in a direction that is tangential to the inner surface 50, as shown in FIG. 7.

The cap 32 may be a generally disk-shaped member that may be mounted to or integrally formed with the inlet body 30. The cap 32 may include a central aperture 54 (shown best in FIG. 5) that may be coaxial with the cylindrical cavity 51 and the conical cavity 40. The cap 32 may partially enclose the cylindrical cavity 51.

The conduit 34 may be a generally cylindrical, tubular member and may extend through the central aperture 54 of the cap 32. The conduit 34 may include an outer surface 58 and an inner surface 60. The inner surface 60 may be defined by the longitudinal axis A1. The conduit 34 may include a first tapered end 62 and a second end 63. One or more inlet passages 64 may be disposed at or near the first tapered end 62 and may extend through the outer surface 58 and the inner surface 60. In some embodiments, the inlet passages 64 could be formed anywhere in the conduit 34 between the cap 32 and a tip of the tapered end 62. The inlet passages 64 could include slots, circular holes, oblong holes, and/or any other shape openings.

The second end 63 may include an outlet 66 in communication with the inlet passages 64. As shown in FIG. 6, the conduit 34 may extend through the cylindrical cavity 51 and into the conical cavity 40. In some embodiments, the first tapered end 62 may be disposed at least partially within the conical cavity 40. The second end 63 may protrude from the cap 32 such that the outlet 66 is spaced apart from the cap 32 and the inlet body 30.

Figure 2:
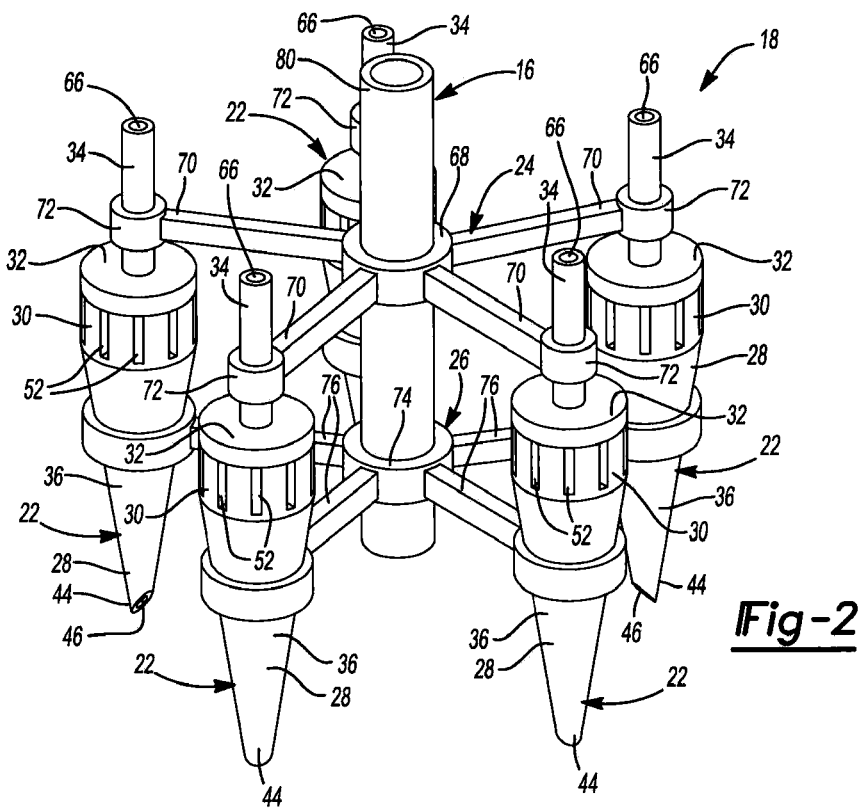
FIG. 2 is a perspective view of the aeration-reduction system of FIG. 1.
Figure 3:
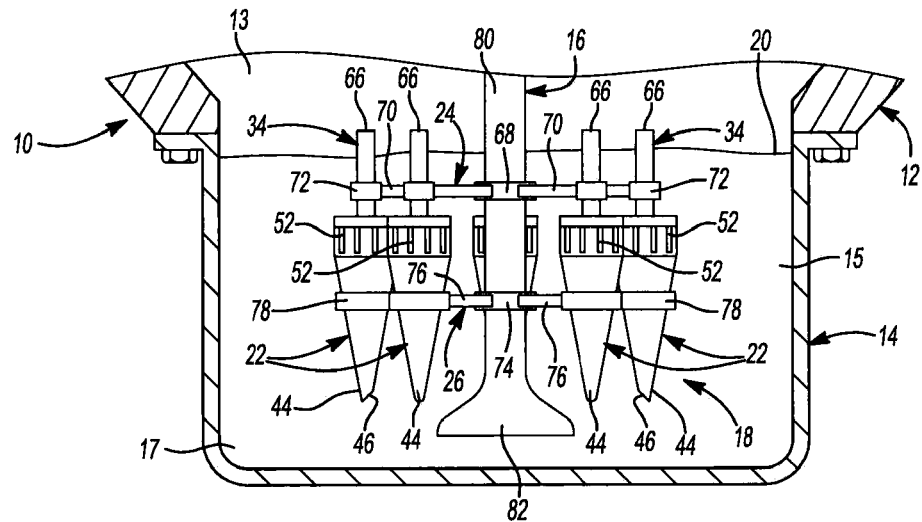
FIG. 3 is a partial cross-sectional view of the engine of FIG. 1.
Figure 4:
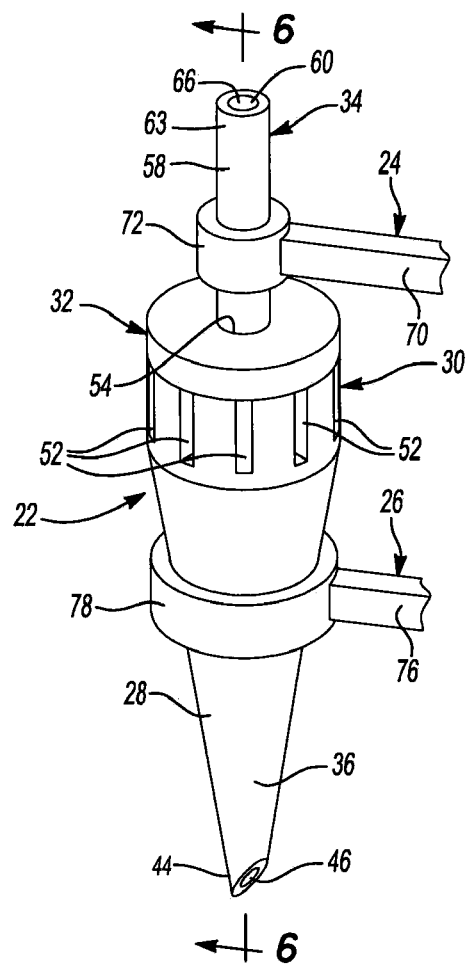
FIG. 4 is a perspective view of a separator of the aeration-reduction system according to the principles of the present disclosure.
Figure 5:
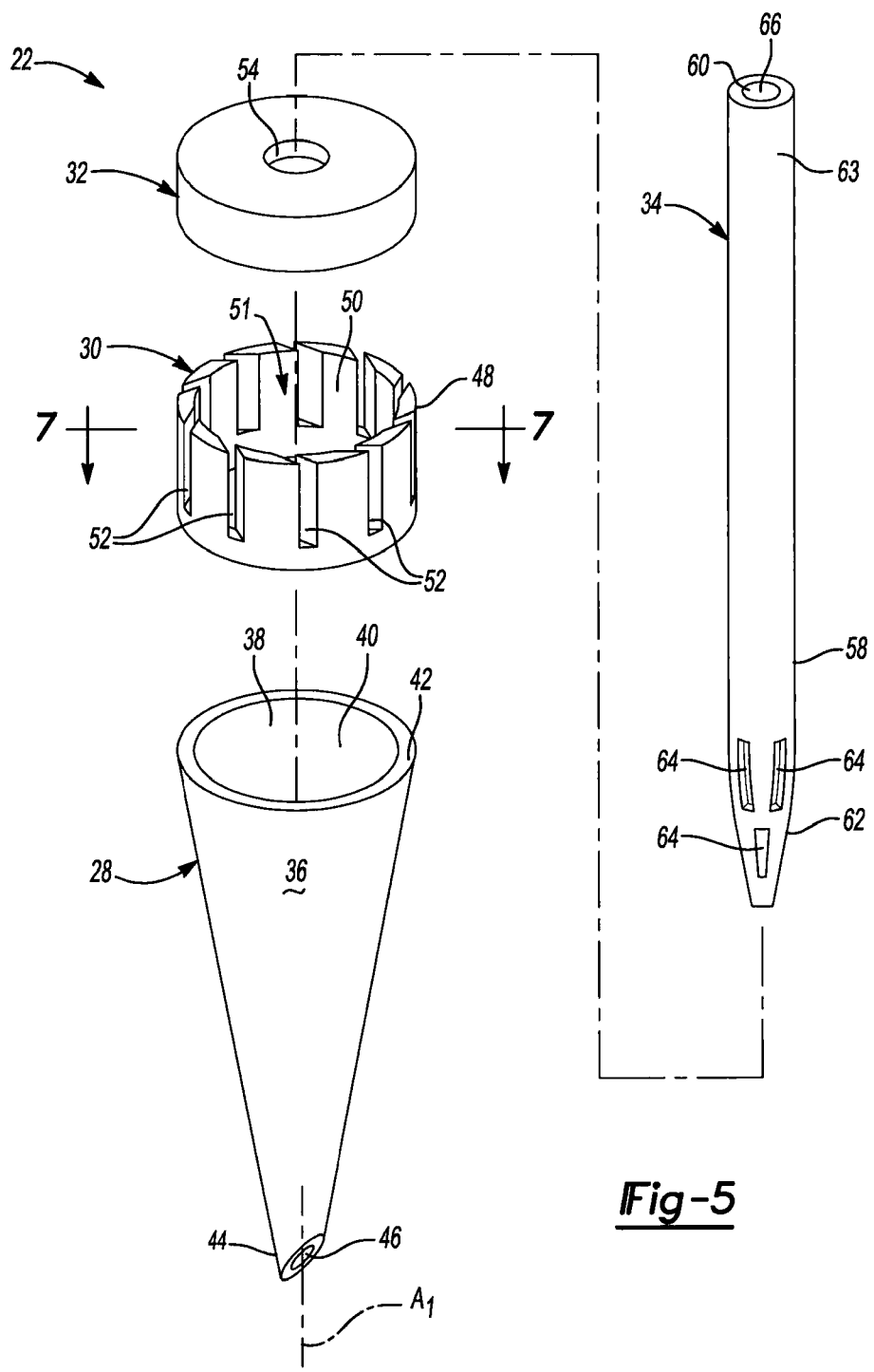
FIG. 5 is an exploded perspective view of the separator of FIG. 4.

As shown in FIGS. 2 and 3, the upper bracket 24 may include a central hub 68, one or more arms 70, and one or more collars 72. The central hub 68 may be a generally annular member engaging a conduit 80 of the oil pump 16, for example, or any other structure of the oil pump 16 or oil pan 14. Each of the arms 70 may be angularly spaced apart from each other and may extend radially outward from a central hub 68. Each of the collars 72 may be disposed at a radially distal end of a corresponding one of the arms 70. The collars 72 may be generally annular members that engage the conduit 34 of a corresponding one of the separators 22 between the cap 32 and the outlet 66.

The lower bracket 26 may include a central hub 74, one or more arms 76, and one or more collars 78. The central hub 74 may be a generally annular member engaging the conduit 80 of the oil pump 16, for example, or any other structure of the oil pump 16 or oil pan 14. The arms 76 may be angularly spaced apart from each other and may extend radially outward from the central hub 74. Each of the collars 78 may be disposed at a radially distal end of the corresponding one of the arms 76. The collars 78 may be generally annular members that engage the outer surface 36 of the main body 28 of a corresponding one of the separators 22.

As shown in FIG. 3, the upper and lower brackets 24, 26 may cooperate to position the separators 22 around the conduit 80 of the oil pump 16 such that the main body 28, the inlet body 30, and the cap 32 of each of the separators 22 are submerged below the surface 20 of the oil 15 and the outlet 66 of the conduit 34 is disposed above the surface 20 of the oil 15. Each of the separators 22 may be positioned such that the outlet 46 of the main body 28 generally faces an inlet 82 of the oil pump 16.

With continued reference to FIGS. 1-7, operation of the aeration-reduction system 18 will be described in detail. While the oil pump 16 is operating, each of the separators 22 may be operable to draw oil 15 in through the inlet passages 52 and separate gases from the liquid oil. The liquid oil may exit the separators 22 through the outlet 46 and the gases may exit the separators 22 through the outlet 66 of the conduit 34.

As shown in FIG. 6, oil enters the separator 22 through the tangentially extending inlet passages 52 and flows into the conical cavity 40. The tangential orientation of the inlet passages 52 in combination with the conical shape of the conical cavity 40 causes the oil to flow in a cyclonic path through the conical cavity 40. As the oil flows along the cyclonic path toward the outlet 46, centrifugal force causes the relatively heavier liquid to flow to the outside of the cyclonic flow path (i.e., at or adjacent the inner surface 38 of the main body 28) while the gas bubbles 90 tend to remain at or near a center of the cyclonical flow path (i.e., at or adjacent the longitudinal axis A1). The liquid oil may continue to flow along the cyclonic flow path toward the outlet 46 while the gas bubbles 90 may migrate upward toward the conduit 34 and may enter the conduit 34 through the inlet passages 64. The gas bubbles 90 may flow upward through the conduit 34 and exit the conduit 34 through the outlet 66. The liquid oil exiting the main body 28 of the separators 22 through the outlet 46 may have a lower aeration percentage than the oil entering the separators 22 through the inlet passages 52. The gas bubbles 90 exiting the separators 22 through the outlet 66 may flow into a crankcase 13 of the engine 10 or to a crankcase-gas-recirculation system, for example. It will be appreciated that the aeration-reduction system 18 could be tuned to adjust an overall aeration level of the oil 15 in the reservoir 17 by adjusting the number of separators 22 incorporated in the aeration-reduction system 18.

Figure 8:
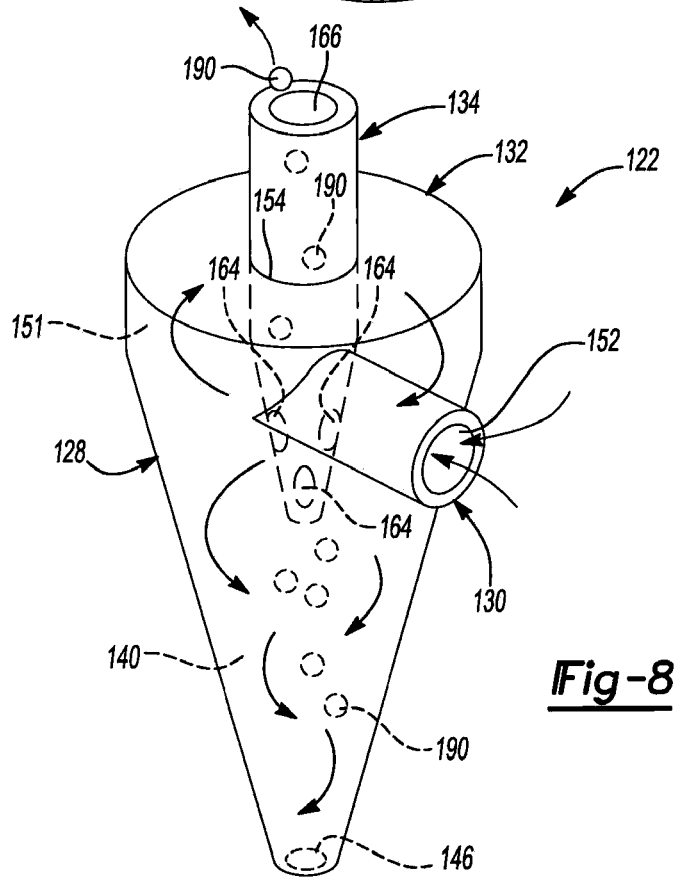
FIG. 8 is a perspective view of another separator according to the principles of the present disclosure.

With reference to FIG. 8, another separator 122 is provided that may include a main body 128, an inlet body 130, a cap 132, and a conduit 134. One or more separators 122 could be incorporated into the aeration-reduction system 18 instead of or in addition to one or more of the separators 22. The structure and function of the separator 122 may be substantially similar to the separator 22 described above, apart from any exceptions noted below or shown in the figures.

Like the main body 28, the main body 128 may define a conical cavity 140 having an outlet 146. The cap 132 may be integrally formed with the main body 128 and may define a cylindrical cavity 151 that is in communication with the conical cavity 140. The cap 132 may include a central aperture 154 through which the conduit 134 may extend into the cylindrical cavity 151 and the conical cavity 140. Like the conduit 34, the conduit 134 may include one or more inlet passages 164 and an outlet 166.

The inlet body 130 may be a generally tubular member that extends tangentially from the main body 128 and/or the cap 132. The inlet body 130 may include an inlet passage 152 that is in communication with the cylindrical cavity 151 and the conical cavity 140. While the particular embodiment illustrated in FIG. 8 include a single inlet body 30 and a single inlet passage 152, in other embodiments, the separator 122 could include a plurality of inlet bodies 130 and inlet passages 152. Like the inlet passages 52, the inlet passage 152 extends tangentially relative to the cylindrical cavity 151 and the conical cavity 140 such that fluid entering the separator 122 through the inlet passage 152 flows in a cyclonic flow path toward the outlet 146. As described above, gas bubbles 190 are separated from the liquid oil as the oil flows along the cyclonic flow path and the gas bubbles 190 may migrate toward the inlet passages 164 of the conduit 134. The liquid oil may exit the separator 122 through the outlet 146 and may reenter the reservoir 17 with a reduced aeration percentage. The gas bubbles 190 may exit the separator 122 through the outlet 166 in the manner described above.

While the aeration-reduction system 18 is described above as removing gas from oil in the oil pan 14 of the engine 10, it will be appreciated that the aeration-reduction system 18, the separator 22, or the separator 122 could be incorporated into any liquid reservoir of a vehicle or any other system, machine, or device to separate gas from liquid and reduce an aeration level of the liquid.

What is claimed is:

1. A separator device comprising:
    a main body having a conical interior surface defining a conical cavity, the conical interior surface being defined by a longitudinal axis, the conical cavity having a first outlet at a tip of the main body;
    an inlet portion connected to the main body and including an outer surface, a cylindrical inner surface, and a first inlet passage extending between the outer surface and the cylindrical inner surface, the cylindrical inner surface being defined by the longitudinal axis, the first inlet passage being positioned relative to the cylindrical inner surface such that a fluid flow through the first inlet passage is generally tangent to the cylindrical inner surface; and
    a gas outlet conduit extending through the inlet portion along the longitudinal axis and into the conical cavity, the gas outlet conduit including a second inlet passage disposed inside of the conical cavity and a second outlet disposed outside of the main body and the inlet portion,
    wherein the first outlet extends through the main body at a non-perpendicular angle relative to the longitudinal axis.

2. The separator device of claim 1, wherein the inlet portion includes a plurality of first inlet passages angularly spaced apart from each other, the conical cavity configured to receive fluid from each of the first inlet passages.

3. The separator device of claim 1, wherein the gas outlet conduit includes a substantially cylindrical portion and a tapered portion.

4. The separator device of claim 3, wherein the tapered portion is axially aligned with the conical cavity.

5. The separator device of claim 3, wherein the second inlet passage is disposed at a tip of the tapered portion.

6. The separator device of claim 3, wherein the second inlet passage is disposed in the tapered portion between a tip of the tapered portion and the cylindrical portion.

7. The separator device of claim 1, wherein the outlet conduit includes a plurality of second inlet passages disposed radially inward relative to the conical interior surface and the cylindrical inner surface.

8. A system comprising:
    a reservoir containing a liquid; and
    a separator device disposed in the reservoir and including a body and a conduit, the body having a conical interior cavity, a first inlet in fluid communication with the conical interior cavity, and a first outlet in fluid communication with the conical interior cavity, the conduit including a second outlet and a second inlet in communication with the conical interior cavity,
    wherein the first inlet and the first outlet are submerged below a surface of the liquid such that the conical interior cavity receives liquid from the first inlet and discharges liquid back into the reservoir through the first outlet, and
    wherein the second outlet is disposed above the surface of the liquid such that the second outlet discharges a gas separated from the liquid above the surface of the liquid,
    wherein the first outlet is disposed proximate a pump inlet disposed in the reservoir.

9. The system of claim 8, wherein the reservoir is an engine oil pan, and the liquid is an engine oil.

10. The system of claim 8, wherein the body of the separator device defines a cyclonic flow path between the first inlet and the first outlet.

11. The system of claim 8, further comprising a plurality of separator devices disposed proximate the pump inlet in the reservoir.

12. The system of claim 11, further comprising a first bracket member including a first hub member engaging the pump component and a plurality of first arm members each engaging a respective one of the plurality of separator devices.

13. The system of claim 12, further comprising a second bracket member including a second hub member engaging the pump component and a plurality of second arm members each engaging the conduit of a respective one of the plurality of separator devices.

14. A system comprising:
a reservoir containing a liquid; and
a separator device disposed in the reservoir and including a body and a conduit, the body having a conical interior cavity, a first inlet in fluid communication with the conical interior cavity, and a first outlet in fluid communication with the conical interior cavity, the conduit including a second outlet and a second inlet in communication with the conical interior cavity,
wherein the first inlet and the first outlet are submerged below a surface of the liquid such that the conical interior cavity receives liquid from the first inlet and discharges liquid back into the reservoir through the first outlet, and
wherein the second outlet is disposed above the surface of the liquid such that the second outlet discharges a gas separated from the liquid above the surface of the liquid,
wherein the body of the separator device includes a plurality of first inlets angularly spaced apart from each other, the conical interior cavity configured to receive fluid from each of the first inlets.

15. The system of claim 14, wherein the conduit includes a substantially cylindrical portion and a tapered portion.

16. The system of claim 15, wherein the tapered portion is axially aligned with the conical interior cavity.

17. The system of claim 16, wherein the conduit includes a plurality of second inlets disposed inside of the conical interior cavity.

18. The system of claim 8, wherein the first outlet is defined by a surface of the body that is disposed at a non-perpendicular angle relative to a longitudinal axis defining the conical interior cavity.

* * * * *